June 21, 1927.
F. W. CUTLER
1,633,002
FRUIT GRADER
Filed Jan. 15, 1925 2 Sheets-Sheet 1
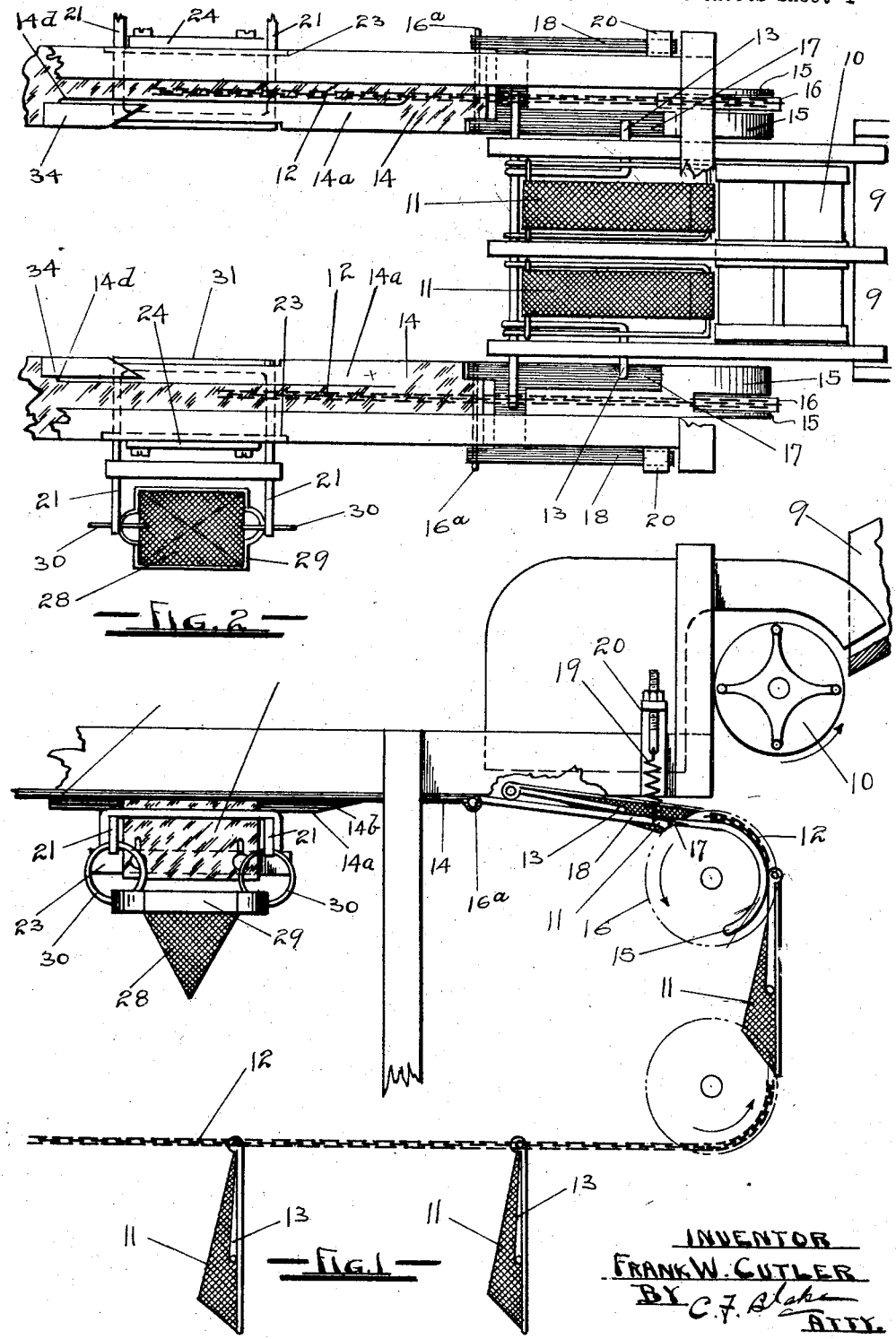

June 21, 1927.
F. W. CUTLER
FRUIT GRADER
Filed Jan. 15, 1925
1,633,002
2 Sheets-Sheet 2
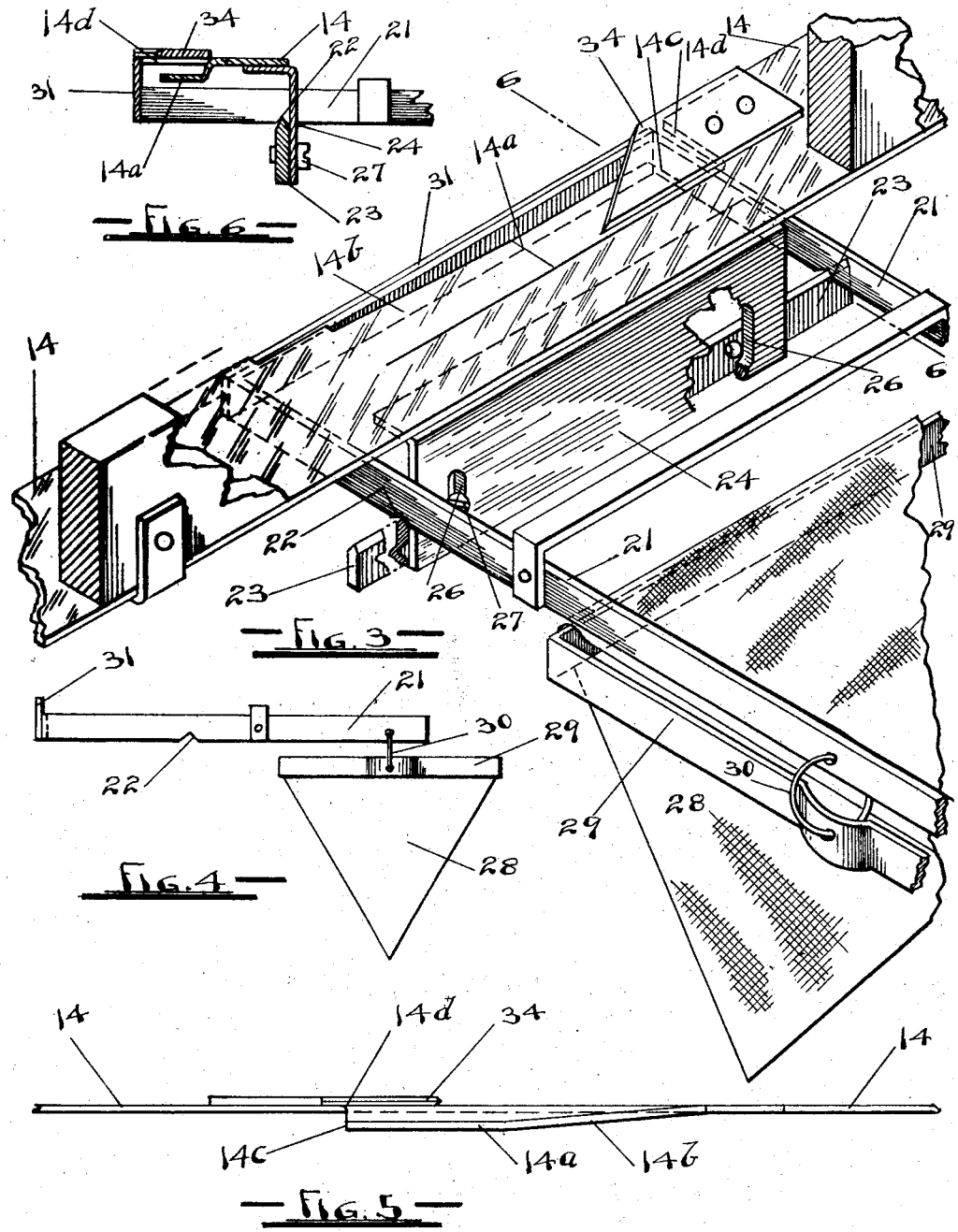

Patented June 21, 1927.

1,633,002

UNITED STATES PATENT OFFICE.

FRANK W. CUTLER, OF PORTLAND, OREGON, ASSIGNOR TO CUTLER MANUFACTURING COMPANY, OF PORTLAND, OREGON, A PARTNERSHIP.

FRUIT GRADER.

Application filed January 15, 1925. Serial No. 2,684.

My invention relates to fruit graders in general, and particularly to such graders as grade the fruit by weight. The present invention is an improvement upon that presented in the Patent No. 1,184,697 issued to me and assigned to the Cutler Fruit Grader Co., under date of May 23, 1916, which patent disclosed a series of pockets conveyed upon endless chains over a series of weighing devices. The objects of the present improvement is to provide better protection for the fruit against bruising by means of improved mechanism for receiving the fruit upon the machine and improved weighing devices that will not bruise the fruit as the pockets travel upon and over the weighing devices. Further desirable results will appear hereinafter.

I accomplish the above object by means of the construction illustrated in the accompanying drawings, which are a part of this application for Letters Patent, like characters of reference indicating like parts throughout the several views thereof, and in which:

Fig. 1 is a side elevation of a portion of a fruit grader machine embodying my improvements.

Fig. 2 is a plan view of the subject matter of Fig. 1.

Fig. 3 is a perspective view of the weighing mechanism, upon an enlarged scale.

Fig. 4 is a side view of the weighing mechanism.

Fig. 5 is a side elevation of the portion of the track adjacent with the weighing mechanism.

Fig. 6 is a section upon line 6—6 of Fig. 3.

The fruit is conducted to the machine by means of a suitable trough 9, which deposits the fruit into pockets upon a pocketed revolving member 10, one piece of fruit into each pocket. As this member revolves the fruit is deposited into pockets 11, which pockets are propelled through the length of the machine by means of chains 12. Said chains may be driven by any of the well known driving devices, such driving devices being no part of this invention are not shown on the drawing. Each pocket is pivotally mounted upon these chains, and is provided with a finger 13 which travels upon a track 14, and retains the pocket in a horizontal position throughout its travel through the machine except when it is dropped by passing over one of the weighing mechanisms as hereinafter described. A guard 15 is provided over the chain sprocket 16 to guide the fingers 13 upon the track 14. Between the track 14 and said guard 15 is disposed a spring supported tongue. This tongue is pivotally secured to the track 14 at 16, and one portion 17 thereof coacts with the guard 15, and receives the fingers therefrom. The other portion 18 receives the end of a spring 19, the other end of said spring being supported upon a suitable bracket 20, and thus the spring supports the tongue in a vertically yieldable manner. Thus as the fruit is dropped upon the pockets from the revolving pocketed member 10 the tongue is free to give slightly in a vertical direction by deflecting the spring 19, and thus the jar upon the fruit is removed, and the fruit is not damaged by dropping into the pockets.

It has been found further necessary to protect the fruit from damage due to jars at the weighing mechanisms, and this I accomplish as follows.

The weighing mechanism consists of a substantially rectangular frame 21 with a notch 22 therein adapted to receive the knife edge of a fulcrum bar 23, which fulcrum bar is mounted beneath the track 14 by means of a suitable bracket 24. To adjust said fulcrum bar vertically so that the same will aline properly with the track and with the weighing mechanism I provide said bracket with slots 26 to receive screws 27 threaded into the fulcrum bar 23. By this construction the fulcrum bar may be adjusted vertically at either end, and thus alined with the track and weighing mechanism.

A basket 28 is mounted upon a frame 29, and is suspended from the frame 21 by means of rings 30, so that said basket hangs perfectly free and without friction that would interfere with the correct functioning of the weighing mechanism.

The frame 21 extends across the track 14 beneath the latter, and is provided with a hardened bar 31 which bar is disposed parallel with the track, and substantially level with the same in a depression provided for this purpose in the track. At each weighing mechanism the track 14 is depressed as shown at 14ª, said depression having an inclined portion 14ᵇ down which the fingers 13 travel when the pockets 11 are to be tripped by the weighing mechanism, and thus all damage to the fruit from jar occasioned by sudden dropping of the finger 13 at these points is avoided.

As the pockets 11 pass through the machine the fingers 13 travel upon the hardened bars 31 as they pass the several weighing mechanisms. At each weighing mechanism a piece of fruit the size desired to be sorted out at that particular weighing mechanism is deposited within the basket 28 as a weight. As the fingers 13 pass over the hardened bars 31, should the piece of fruit within the respective pocket 11 equal the weight of the piece of fruit within the respective basket 28, the finger 13 resting upon the hardened bar 31 will depress the latter, and this will allow the finger to travel upon the depressed portion of the track 14. When such finger 13 arrives at the end of the depressed portion of the track, as shown at 14ᶜ the pocket 11 respective thereto will drop into a vertical position, and deposit the fruit therein into a receptacle placed to receive it.

Since the pieces of fruit vary greatly in weight, it is not practical to sort into exactly equal weights, as this would mean too many grades of fruit, and thus it happens that the hardened bar 31 will sometimes be totally depressed, and sometimes only partially depressed by the fruit that should be deposited into the receptacle respective thereto. When the said hardened bar 31 is only partially depressed the fingers 13 would at times bind by sticking against the edge of the track 14 made by the process of depressing that portion of said track, and to prevent this, and to guide said fingers 13 at this point of their travel I provide a diagonally ground knife edge member 34, and also point the end of the fingers 13 as shown at 13ᵃ in Fig. 7. The pointed end of the fingers 13ᵃ will contact with the diagonal knife edge of the member 34 and thus be guided either downward into the depressed portion of the track 14, or upward onto the upper surface of the track 14 to continue their travel thereupon.

Not only does the construction described save the fruit from damage by all jars within the machine, but also the weighing mechanism described is extremely substantial and rigid in its construction, is easily adjusted and kept in proper alinement, and is very sensitive in operation.

My device may be made of any size, and constructed of any materials deemed convenient and suitable for a device of this character, and while I have illustrated and described a form of construction and arrangement of parts found desirable in materializing my invention, I wish to include in this application all mechanical equivalents and substitutes that may fairly be considered to come within the scope and purview of my invention as described in the appended claims.

Having disclosed my invention so that others may be enabled to construct and to use the same, what I claim as new, and desire to secure by Letters Patent is:

1. In a fruit grader: an endless traveling chain; a chain sprocket; a track upon which said chain travels; a member pivotally mounted upon said track adjacent said sprocket adapted to support said chain as it travels from said sprocket to said track; and a spring supporting the free end of said member.

2. In a fruit grader: a track having a vertically yieldable end portion, and a plurality of depressed portions having inclined approaches thereto, each being for the purpose of preventing damage to the fruit from sudden jars as it passes through the grader.

3. In a fruit grader: a track; a plurality of depressed portions of said track each having an inclined approach thereto; and weighing mechanism adjacent each of said depressed portions.

4. In a fruit grader: a track; a plurality of depressed portions of said track, each having an inclined approach thereto; a fulcrum bar adjacent each such depression; and a weighing mechanism supported upon said fulcrum bar.

5. In a fruit grader: a track; a plurality of depressed portions of said track, each having an inclined approach thereto; a fulcrum bar adjacent each such depression; a bracket supporting said fulcrum bar in a vertically adjustable manner; and a scale device mounted upon said fulcrum bar and having a member disposed adjacent said depression and in alinement with the surface of said track.

6. In a fruit grader: traveling pockets supported upon a track; a weighing device coacting with said pockets consisting of a vertically adjustable fulcrum bar; a frame supported upon said bar; and a weight receptacle hung from said frame.

7. In a fruit grader: a plurality of pockets to receive the fruit; means to move said pockets longitudinally through the grader; a track supporting said pockets as they travel; depressions in said track; inclined approaches to said depressions; weighing mechanism at said depressions adapted to guide a portion of a pocket into the respective depression upon a predetermined weight of the fruit in said pocket; and an adjustable support for said weighing mechanism.

8. In a fruit grader: traveling pockets adapted to be dumped at predetermined points of their travel; a track to support said pockets, and having a vertically yieldable portion at that end thereof where said pockets enter upon said track, and depressions with inclined approaches at said predetermined points of dumping.

9. In a fruit grader: a track supporting the moving portion of the grading apparatus, and having depressed portions coacting therewith, each of said depressed portions having one end thereof an inclined plain leading from said track, and the other end thereof being open.

10. In a fruit grader: a plurality of fruit carrying traveling pockets supported upon a track, and adapted to be dumped at predetermined points of their travel; means upon said track to relieve the jar as the fruit is deposited in said pockets; and means upon said track to relieve the jar as said pockets travel over the dumping mechanism.

In witness whereof I claim the foregoing as my own I hereunto affix my signature at Portland, county of Multnomah, State of Oregon, this 20th day of Feb., 1924.

FRANK W. CUTLER.